Oct. 9, 1956  V. P. MUSSIO  2,765,565
UNDERSEA DETECTOR
Filed July 19, 1954  3 Sheets-Sheet 1
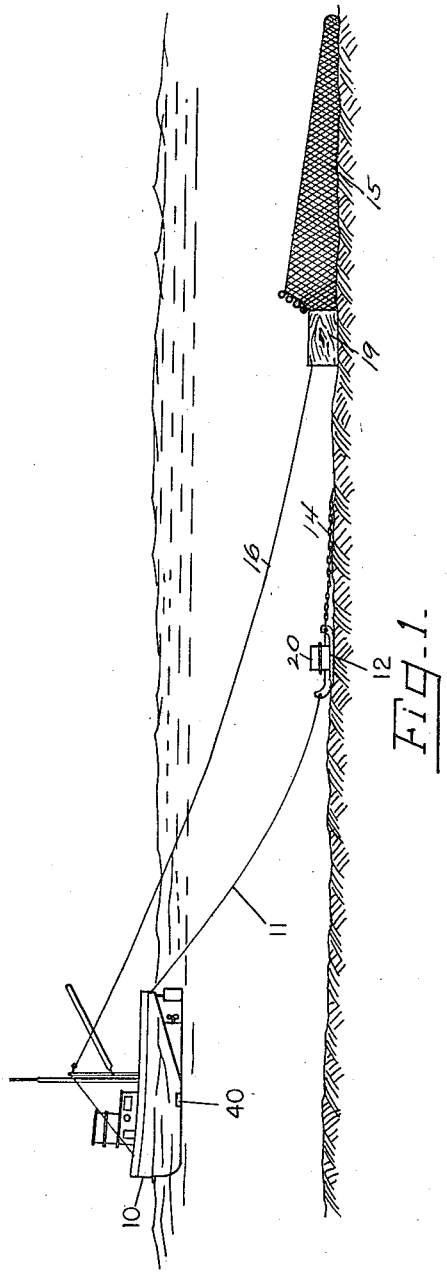
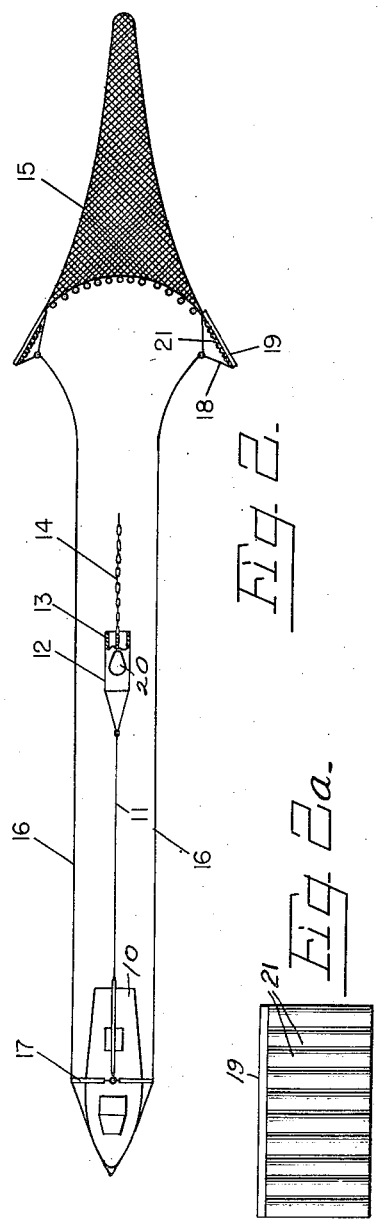
INVENTOR.
VICTOR P. MUSSIO Oct. 9, 1956 V. P. MUSSIO 2,765,565
UNDERSEA DETECTOR
Filed July 19, 1954 3 Sheets—Sheet 2

INVENTOR.
VICTOR P. MUSSIO
BY
Atty.

INVENTOR.
VICTOR P. MUSSIO

United States Patent Office 2,765,565
Patented Oct. 9, 1956

2,765,565
UNDERSEA DETECTOR
Victor P. Mussio, Mexico City, Mexico

Application July 19, 1954, Serial No. 444,338

11 Claims. (Cl. 43—9)

This invention relates to improved means for locating schools of fish, shrimp and other aquatic animals and for netting the same with a maximum of efficiency.

It is now common practice to equip fishing vessels with echo depth sounders or fathometers and to utilize such sounders in locating fish and especially heavy concentrations of fish in large schools. These echo sounders send out signals through a transducer located beneath the fishing vessel. The returned echoes are amplified and either imposed upon graph paper by a suitable recorder for future use or they are caused to produce a luminous spot on a calibrated dial to serve as a source of immediate information.

The present invention contemplates the use of conventional apparatus comprising a transducer from which ultrasonic waves are broadcast. The echoed ultrasonic waves from objects impinged by the broadcasted waves are received by the same transducer, and converted into electrical energy, which is amplified and acts upon indicating and/or recording elements of the apparatus for indicating upon a dial the azimuth and depth or distance readings of the source of the returning echoes. Here the resemblance of this invention to the prior art devices, ceases, in that the transducer employed is not carried by the fishing vessel but is mounted upon a carrier in the nature of a non-buoyant sled. This sled is towed along the ocean floor and operates at a point spaced a considerable distance rearwardly of the fishing vessel and some distance in advance of an open mouth net, which is also towed by the fishing vessel.

The transducer serves not only to indicate upon a dial located in the pilot house of the vessel, the presence of schools of fish, shrimp and the like but also serves to indicate in the pilot house the setting of the net and whether it is so set and is traveling in such position as to net the maximum number of fish or shrimp.

The presence of rocks, submerged derelict vessels and other obstructions are also indicated, to the end that the course of the towing vessel may be changed to avoid damage to the towed transducer and to the expensive and easily damaged net.

The manner in which these objects are accomplished as well as other capabilities and advantages of the invention will be best understood by reference to the accompanying drawings, wherein:

Fig. 1 is a diagrammatic side elevation of apparatus embodying the invention;

Fig. 2 is a plan view of the elements shown in Fig. 1;

Fig. 2a is an enlarged inner face view of one of the net boards shown in Figs. 1 and 2;

Like numerals designate corresponding parts in all of the figures of the drawings.

Figure 3:
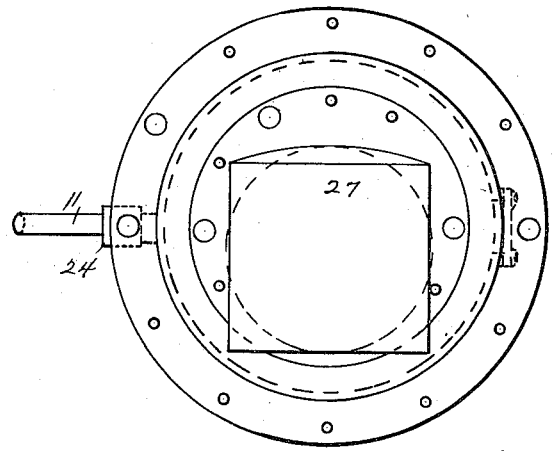
Fig. 3 is a plan view of a transducer, hereinafter described.

In the drawings, 10 designates a conventional fishing vessel. Towed by a cable 11 from the vessel is a non-buoyant, preferably steel, sled 12. This sled may be of any desired construction but is preferably stabilized against lateral travel by runners, 13, and by a trailing section of chain 14. A net 15 is towed by the vessel 10 through cables 16. The forward ends of these cables are connected to outriggers 17 on the vessel. The rear ends of the cables are connected by bridles 18 to net boards 19 in such manner that said boards are held at angles to cause them to function as paravanes and to tend to move outwardly, or away from each other. Thus, the mouth of the net is kept open as much as possible. This not only results in netting the maximum number of fish but it incidentally widens the angles between net boards 19 and a transducer 20 that is mounted upon the top of sled 12. To cause the net boards to echo the impinging ultrasonic waves in an effective way, the inner faces of said boards 19 are covered by vertically corrugated webs 21. These webs may be of rubber or any other suitable material or the inner faces of the boards, themselves, may be vertically grooved and thus corrugated.

Figure 4:
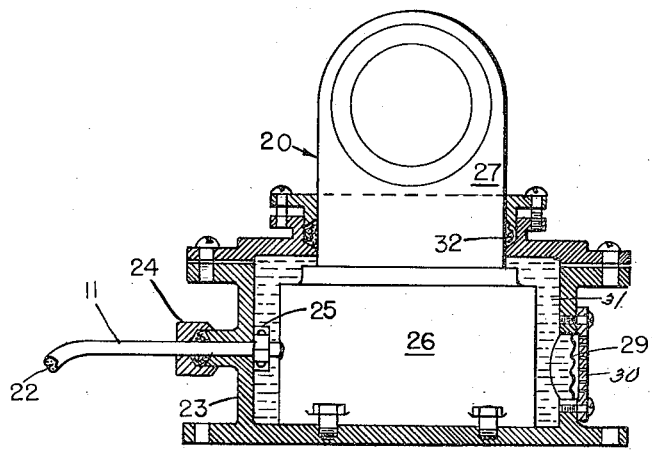
Fig. 4 is a transverse sectional view of the transducer and its mounting.

The cable 11 not only functions as a tow cable for the sled but it may also carry the electrical conductors 22 by which the transducer (Fig. 4) is connected to the conventional recording and indicating mechanism (Figs. 5 and 6) which in practice will be located in the pilot house of vessel 10. In Fig. 4 it is shown that cable 11 has water tight connection with the transducer casing 23 through a packing or stuffing box 24. To further anchor the cable to the casing, a clamp 25 is applied thereto inside the casing. The cable conducts current to a synchronous motor 26 and this motor imparts continuous rotation, about a vertical axis, to the rotative broadcasting head 27 of the transducer. The external sea water pressure about casing 23 is imposed upon a flexible diaphragm 29 which lies behind a protecting screen 30 and through which diaphragm corresponding pressure is imposed upon a body of oil 31 in said casing. Entry of sea water to casing 23 around the exit of head 27, is prevented by a stuffing box mounted upon head 22 of casing 23 and serving to compress packing 32. The creation of like pressures upon each side of the stuffing boxes minimizes leakage of sea water into casing 23.

It has been found that in those systems of fish detection in which the transducer is located beneath the bottom of the fishing vessel, useful results are achieved where the schools of fish are located well above the bottom. However, where the schools of fish or shrimp are close to the bottom much confusion in the signals has been caused by signals emanating from numerous small rocks, shells and other bottom formations. By so mounting the transducer that it travels close to the bottom there is little chance of inanimate objects interfering with signals indicative of food animals such as fish, shrimp and the like. Since the scanning ultrasonic emanations from the transducer are sent out through an arc of 360° and, in the main, in a plane parallel to the ocean floor it follows that little interference will be caused by small rocks, shells and other small bottom formations. In the case of large rock formations, derelict and sunken vessels or other large obstructions, the transducer will reveal their existence in time for the course of the vessel to be changed, to avoid them.

Since ultrasonic waves obey the known laws of physics and travel along a widening angle, no thin beam can be obtained and it is impossible to differentiate objects which are close to each other and separated only by a small angle, i. e., the angle between two azimuths from the transducer.

As stated, some depth recorders or scanners make use of ultrasonic waves sent by a transducer installed on the bottom of the boat. Consequently, the angles registered from the transducer as a center and between objects such as shrimp, fish, and small rocks, and the bottom of the sea where they are lying are very small.

To enlarge those angles in order to increase the precision of the device, it is highly desirable to measure them from a conveniently located center, but not from the bottom of the boat.

Thus, my invention contemplates the provision of a transducer mounted upon a sled like support which in its travel is located rearwardly of the towing vessel and between the vessel and a towed open-mouth net and preferably fairly close to the mouth of the net. The rotary motion of transducer head 27 will be synchronous with a corresponding motion of the rotating arms or translating stylus of the indicator or recorder installed in the pilot house of the boat and the cabinet of which is indicated at 33 in Fig. 6. This constitutes a new application of ultrasonic transmitters, as the waves are, as stated, parallel to the bottom of the sea and not perpendicular or obliquely to the bottom. Furthermore, the waves scan a full circle parallel also to the bottom.

Cabinet 33 carries the conventional apparatus commonly employed in conjunction with transducers such as that illustrated in Fig. 4, to receive and indicate upon its screen 34 the azimuths and depths or distances of signal echoes picked up by the transducer. It is sufficient to say, with respect to the structure shown in Fig. 6, that the arms 35 and 36 are driven by a motor, indicated at 37, in synchronism with motor 26 of head 27. These arms rotate about a common center. Arm 35 rotating at one revolution per minute will indicate azimuths on scale 37 while arm 36 rotating at 60 revolutions per minute will indicate the depths or distances on scale 38.

The indications will be given by a small lamp or neon tube 39 attached on each arm. When the luminous spots appear on the dials, meaning that echoes are received, the spot on the distance dial will indicate the distance from the transducer to the object whose azimuth is shown in the same moment by the other spot on the angle dial in the usual and known way. A reference point showing on the dial the origin of azimuths will be obtained by a convenient echo from the boat or from an object towed along the course followed by the boat, for example, the echo resulting from the cable towing the sleigh.

Normally, the rotating arms will give said indications, but a switch will permit the stopping of the azimuth indicating arm and rotating transducer in any chosen position for any amount of time, allowing the distance arm to continue its rotation. This will give the distance of the object whose azimuth is precisely indicated by the other arm. This is in case the observer finds it necessary to give more attention to or get more information from a desired azimuth, as for instance, if the distance is rapidly increasing or decreasing from a moving object. Another switch will permit use of the distance arm with another transducer 40 located on the hull to give the depth of the bottom, as in present depth recorders. Conventional switches for the purposes indicated and others found desirable are indicated at 41. If recorded indications are found desirable, a conventional recorder (Fig. 5) with one or various sensibilities could be used. The readings could be interpreted with two graduations, one in abscissas lines will show the azimuth angles, proportional to the travel of the recording paper per turn of the rotating transducer.

The operation of the described structure is as follows. With the boat 10 in motion and with the sled being drawn over the ocean bottom electric current is supplied to the mechanisms in cabinet 33 and casing 23. With motors 26 and 27 running in synchronism, arms 35 and 36 are rotated in synchronism with transducer head 27. Every second, as the 60 R. P. M. distance arm 36 passes the zero mark of the dial, it fires an emission of ultrasonic waves. If a resulting echo returns to the transducer it is amplified and both arms produce a luminous spot on each dial scale. The distance will be indicated by the length of the arc between the zero mark and the spot, as in present depth recorders. The azimuth will be shown by the position of the spot on the angle dial, and the angle measured by the length of the arc between the origin and the spot.

Figure 5:
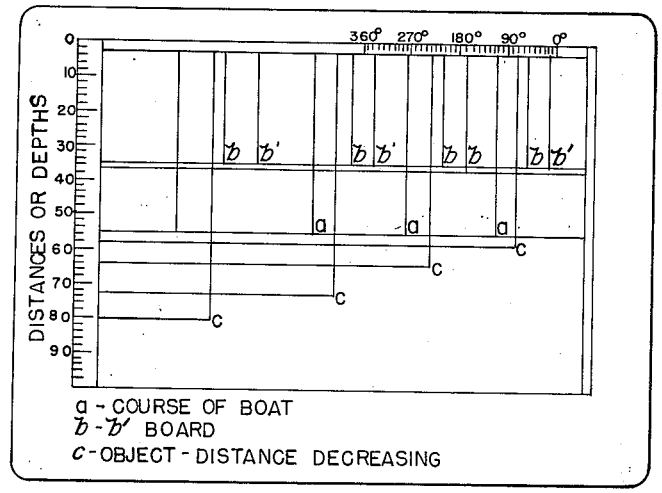
Fig. 5 is a face view of a chart, illustrating the manner in which azimuth and distance and depth indications and the relative setting of the net boards, may be permanently recorded.
Figure 6:
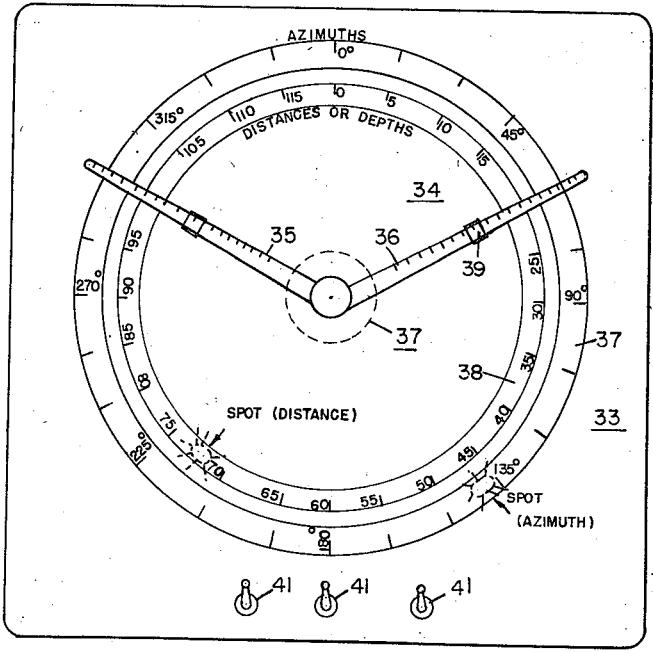
Fig. 6 is a face view of the indicator screen upon which azimuth and depth or distance indications are set up in a conventional way as hereinafter described.

At the beginning of the operation, it will be found convenient to have the origin of angles coincident with the azimuth of the boat indicated, for example, by the echo, received by the towing cable of the sled. This can be obtained by constructing the angle dial in such a way that it will be possible to turn it by hand until the zero mark is on the spot showing the azimuth of the boat. It is then easy to steer the boat accordingly in or out of the way of other objects giving an eventual spot in another azimuth on the dial. The opening between the boards, if correct, will give two spots equally distant from the 180 degrees mark, the value of both angles depending on the distance shown on the other dial and previously computed for every net or different working conditions. In Fig. 5, for example, the position of the boards is recorded by the vertical lines b—b' on the azimuth scale. Here it is shown that by a line a that when the course of the boat was approximately 270° the net boards occupied azimuth positions indicated by the lines b'—b equidistant from line a. If the lines b—b' were materially closer to each other than they should be it would indicate to the pilot that the mouth of the net was not being held open by the action of the net boards to the extent that it should be and he would take steps to correct the action of said boards. Normally, the angle dial will show three spots, one at zero angle, which is the course of the boat, and the others at the same angle on both sides of the 180 degrees mark. The other dial will show also three spots which will give the distance of the boards from the sled. If another spot appears on the angle dial, a corresponding spot will appear also on the distance dial giving the distance of the object lying in the indicated azimuth. If said object is interpreted as a school of shrimp, the course of the boat will be altered until the corresponding angle spot will coincide with the spot indicating the course of the boat. If necessary, the rotation of the angle arm and transducer will be stopped in order to follow the object with more attention. The spot appearing each second on the distance dial will show whether the distance is increasing or decreasing. On the contrary, if another spot appears showing an object interpreted as dangerous for the net, lying exactly in the path of the net, the course can be altered in time to save the net. If the master of the boat needs depth indications, he can get them easily by throwing the switch governing the use of the transducer installed under the hull of the boat. The reading will be made on the distance dial.

It will be apparent that the utility flowing from the placing of the transducer in the position described (close to the bottom and in association with an open mouth net) will be present whether the waves broadcast are supersonic waves or electrical waves as long as such waves are of a nature to create an echo which can in turn indicate the azimuths and distances or depths of an impinged object. For example, a device known as an isotropic detection device embodies a transducer which simultaneously scans 360° horizontally and without itself rotating. The mounting of such an isotropic transducer upon the sled in place of the rotating transducer is within the scope of the invention. The term "echo" as herein used is to be broadly construed to include either sonic or electrical impulses, returned as an echo from an object impinged by a broadcast wave of like nature.

While the greatest measure of utility is had when a transducer is towed to travel along the ocean bottom and in a position where it lies rearwardly of the vertical plane of the boat and also lies forwardly of the open mouth of a towed net and close enough to the net mouth to yield a reading of the relative settings of the net boards, I deem it novel to mount a transducer, capable of receiving echoes through 360 degrees, to travel along the ocean bottom whether in association with a net, or not. It is clear that schools of fish might be located by one vessel having no net and the information radioed to a second vessel equipped to net the school.

Consequently it is to be understood that the invention is not limited to the particular arrangement shown but that it includes within its purview whatever changes fairly fall within either the terms or the spirit of the appended claims:

I claim:

1. Apparatus of the character described comprising a towing vessel, an open mouth fishing net towed thereby, a non-buoyant carrier connected to the vessel and towed thereby to traverse the ocean bottom and to lie at a point between the vessel and the open mouth of the net and a transducer mounted upon the carrier adapted to broadcast waves horizontally over the ocean bottom and to receive echoes therefrom and means upon the towing vessel connected to said transducer for indicating the azimuths of objects impinged by the said broadcast waves as determined by the echoes from the objects impinged.

2. A structure as recited in claim 1 wherein the said net is provided with paravane net boards, one at each side of its mouth, said boards being adapted to return echoes of the broadcast waves impinging thereon.

3. A structure as recited in claim 1 wherein the said net is provided at each side of its mouth with a paravane board, said boards being adapted to travel apart to keep the mouth of the net open and said boards being adapted to return echoes of the broadcast waves impinging thereon.

4. A structure as recited in claim 1 wherein the said net is provided at each side of its mouth with a paravane board, said boards being set to tend to travel apart to keep the mouth of the net open, the inner faces of said boards being vertically corrugated to render them more reflective of impinged waves from the transducer than plain surfaces would be.

5. Means for locating and catching fish consisting of a towing vessel, a horizontally disposed net having a forwardly facing open mouth, net boards secured to the net mouth at each side thereof, towing lines secured to the towing vessel and to said boards and towing said boards and the net while maintaining the boards at such angles to the line of travel as to cause the boards to function as paravanes and to tend to move apart, a sled-like support towed by the vessel and traveling upon the ocean floor ahead of the net mouth and closer to the net mouth than to the vessel, a transducer upon the sled-like support adapted to broadcast waves horizontally over the ocean floor, and an azimuth indicator located upon the vessel and electrically connected to the transducer and operable to indicate the azimuths of objects impinged by the broadcast waves, including the azimuths of the net boards.

6. Means for locating and netting fish comprising a towing vessel, a non-buoyant sled-like support towed by said vessel along the ocean floor, and a transducer mounted upon the support comprising a head rotative through 360 degrees and adapted to broadcast supersonic waves and to receive echoed waves from impinged objects, means upon he towing vessel for indicating the azimuth positions of the impinged objects, under the action of said echoed waves, and an elongated horizontally disposed net having a forwardly facing open mouth in advance of which the sled-like support is mounted, paravane net boards secured to the net at the opposite sides of its mouth and towing cables connected to the vessel and to said boards.

7. In fish locating and netting apparatus, a towing vessel, a non-buoyant sled-like support towed by said vessel along the ocean floor, a transducer mounted upon the sled-like support comprising a casing containing a synchronous motor and a broadcasting and echo receiving head rotatively driven by said motor, an indicating mechanism located upon the vessel, and having a screen graduated in azimuth indications, a rotative arm traveling over said screen, a second synchronous motor driving said arm in synchronism with the rotative transducer head, a tow cable between the vessel and sled-like support, electrical conductors disposed within the tow cable and connecting said synchronous motors, a net comprising an elongated body having a forwardly facing open mouth, the said sled-like support traveling in a position where it lies rearwardly of the vertical plane of the vessel and much closer to the mouth of said net than to said vessel, and paravane net boards located at the opposite sides of the net mouth and set to tend to travel apart.

8. A structure as recited in claim 7 wherein the inner faces of the net boards present vertically corrugated surfaces.

9. A structure as recited in claim 7 wherein the inner faces of the net boards carry protuberant portions shaped to increase the capacity of the waves broadcast by the transducer.

10. A structure as recited in claim 1 in combination with net boards disposed at the outer forward corners of the net and means upon the inner faces of said boards adapted to increase the capacity of said boards to reflect waves broadcast by the transducer.

11. In apparatus for locating fish and drawing a net about the located fish comprising, in combination, a towing vessel, a fishing net towed thereby having a forwardly facing open mouth, a carrier towed by the vessel and located in advance of the open mouth of the net, and a transducer mounted upon the carrier adapted to broadcast waves horizontally therearound and to receive echoes peculiar to those emanating from schools of fish and means upon the vessel for indicating the azimuths of schools of fish as determined by the echoes therefrom.

References Cited in the file of this patent

UNITED STATES PATENTS

| 2,418,846 | Meacham | Apr. 15, 1947 |

FOREIGN PATENTS

| 1,359 | Great Britain | 1903 |
| 817,640 | France | Sept. 7, 1937 |

OTHER REFERENCES

Popular Mechanics, February 1954 issue, page 115.